United States Patent [19]

Schneider et al.

[11] Patent Number: 5,320,788

[45] Date of Patent: Jun. 14, 1994

[54] PROCESS FOR PRODUCING A PLASTIC CASING REINFORCED AGAINST TENSILE FORCE

[75] Inventors: Reiner Schneider, Ebersdorf, Fed. Rep. of Germany; Norbert Niesemeyer, Hickory, N.C.; Wilfried Reissenweber, Rödental, Fed. Rep. of Germany

[73] Assignee: Siemens Aktiengesellschaft, Munich, Fed. Rep. of Germany

[21] Appl. No.: 962,209

[22] PCT Filed: Jun. 7, 1991

[86] PCT No.: PCT/DE91/00492

§ 371 Date: Dec. 23, 1992

§ 102(e) Date: Dec. 23, 1992

[87] PCT Pub. No.: WO92/00180

PCT Pub. Date: Jan. 9, 1992

[30] Foreign Application Priority Data

Jun. 27, 1990 [DE] Fed. Rep. of Germany ....... 4020800

[51] Int. Cl.$^5$ .............................................. B29C 47/02
[52] U.S. Cl. .................................... 264/1.5; 156/172; 156/244.12; 156/244.14; 264/103; 264/108; 264/173; 264/174; 264/230; 264/DIG. 71
[58] Field of Search .............. 264/108, 103, 1.5, 174, 264/173, 230, DIG. 71; 156/172, 244.12, 244.14

[56] References Cited

U.S. PATENT DOCUMENTS

| | | |
|---|---|---|
| 2,674,007 | 4/1954 | Allemann et al. . |
| 3,485,912 | 12/1969 | Schrenk . |
| 3,520,966 | 7/1970 | Soffiantini . |
| 4,129,468 | 12/1978 | Knab ............................ 156/172 |
| 4,205,899 | 6/1980 | King et al. . |
| 4,269,024 | 5/1981 | Ashpole et al. .................. 264/1.5 |
| 4,457,583 | 7/1984 | Mayr et al. ..................... 264/1.5 |
| 4,553,815 | 11/1985 | Martin . |
| 4,592,938 | 6/1986 | Benoit . |
| 4,645,628 | 2/1987 | Gill ............................... 264/1.5 |
| 4,673,540 | 6/1987 | Portinari ........................ 264/1.5 |
| 4,744,935 | 5/1988 | Priaroggia et al. ............... 264/1.5 |
| 4,767,183 | 8/1988 | Martin . |
| 4,826,278 | 5/1989 | Gartside et al. ................. 264/1.5 |
| 4,840,452 | 6/1989 | Federmann et al. .............. 264/103 |
| 4,883,622 | 11/1989 | Dealy et al. .................... 264/174 |
| 4,927,585 | 5/1990 | Suzuki et al. ................... 264/174 |

FOREIGN PATENT DOCUMENTS

| | | |
|---|---|---|
| 0218952 | 9/1986 | European Pat. Off. . |
| 1273800 | 7/1968 | Fed. Rep. of Germany . |
| 1927508 | 3/1970 | Fed. Rep. of Germany . |
| 2845887 | 4/1980 | Fed. Rep. of Germany ....... 264/1.5 |
| 2818297C2 | 2/1983 | Fed. Rep. of Germany . |
| 2740162C2 | 9/1983 | Fed. Rep. of Germany . |
| 1-272812 | 10/1989 | Japan .............................. 264/1.5 |
| 2134842A | 8/1984 | United Kingdom . |

OTHER PUBLICATIONS

Abstract of Japanese published Application 56-49229 (May 2, 1981) Patent Abstracts of Japan, vol. 5, No. 105 (M-77) (777) Jul. 8, 1981.

Abstract of Japanese published Application 62-130821 (Jun. 13, 1987) Patent Abstracts of Japan, vol. 11, No. 352 (M-642) [2799] Nov. 18, 1987.

*Primary Examiner*—Jeffery Thurlow
*Attorney, Agent, or Firm*—Hill, Steadman & Simpson

[57] ABSTRACT

A process for forming a plastic casing having reinforcing elements to resist tensile forces by simultaneously extruding the plastic casing and the reinforcing elements which are in a molten form and then twisting the extruded casing and elements to impart a helical configuration to the elements.

12 Claims, 1 Drawing Sheet

PROCESS FOR PRODUCING A PLASTIC CASING REINFORCED AGAINST TENSILE FORCE

BACKGROUND OF THE INVENTION

The invention relates to a process for producing a plastic casing reinforced against tensile forces by, elements for resisting extension in the plastic casing. The process includes the elements being extruded in molten form at the same time as the plastic casing serving to receive these elements is extruded.

In many cases in which plastic is used as a casing or walling material, the strength value of most plastics does not satisfy the demands made on the casing. Therefore, it is known, for example for plastic insulations for electrical and/or optical cables or lines, to incorporate in the insulation or to bond in a suitable form with the insulation elements for resisting extension (German Patent 2,740,162, German Patent 2,818,297). In such cases, the elements for resisting extension have been placed on or under the insulation and, for example, are adhesively bonded with the insulation, jacket or casing. Processes are also known in which the elements for resisting extension have been fed to the insulation during extrusion.

JP-A-62,130,821 discloses a process in which a tubular body is extruded, reinforcing filaments which may consist, for example, of LCPs and are also embedded in the tube walling being extruded in coextrusion by means of tubular dies. These reinforcing filaments run in straight lines, which may be disadvantageous for some applications, for example in the case of strong bending stresses, in the case of stranding operations, etc.

Also to be cited in this connection as prior art are U.S. Pat. Nos. 4,553,815 and 4,767,183, in which although the use of LCPs reinforcing against tensile forces is already described in the case of optical cables, their simultaneous extrusion is not.

SUMMARY OF THE INVENTION

The invention is based on the object of providing a jacket, casing or covering which is particularly suitable for optical glass fibers and can be used universally. The way in which this object is achieved according to the invention in the case of a process of the type mentioned at the beginning is that the plastic casing serves for producing coverings for optical glass fibers or cables and that, after extrusion, the plastic casing is subjected to a torsional operation before or during the winding-up process, in such a way that the elements for resisting extension run spirally.

In this way, the elements for resisting extension distribute themselves helically, seen in the longitudinal direction, about the longitudinal axis of the covering and, as a result, the latter can optimally withstand, for example, bending and/or stranding operations. Consequently, an optimum protection of the sensitive optical waveguides against mechanical stresses is ensured. The casing and the elements for resisting extension are produced in the desired arrangement from one extrusion apparatus in one process. To be regarded as the special feature in any event is that the reinforcing filaments are incorporated in the desired form in the plastic casing in the molten state of the matrix. Consequently, the primary casing thus produced already fulfills a reinforcing function, which in some cases allows dispensing with additional or further reinforcing elements (Kevlar, GRP, wire reinforcement). This form of reinforcement also allows tough or flexible plastics having good bending properties in a broad temperature range to be used for the primary casings.

In a development of the invention, an embodiment is preferred in which the elements for resisting extension consist of polymers based on liquid crystal polymers (LCPs). This achieves the effect that the elements for resisting extension can be extruded particularly simply in molten form at the same time as the plastic casing or profile serving to receive these elements.

The torsional operation can be accomplished by using stranding devices, in particular based on SZ-stranding devices. In the case of a stationary extrusion die, the extrudate is twisted by making the take-off and the wind-up rotate and thus obtaining a helical fiber reinforcement, or the extrudate is turned alternately to the right and to the left between the extruder head and the wind-up. By this turning, a stranding of the elements which are introduced through the extruder head into the casing tube is also obtained at the same time.

In a further development of the invention, the extrusion die can also be rotated. The advantage of this technique over the conventional insertion of prefabricated reinforcing elements is that the feeding of the reinforcing material is very simple, because there are no rotating run-off points. The arrangement of the reinforcing filaments can, moreover, be fixed according to requirements.

The tube or the covering becomes particularly stiff if the filaments reinforcing against tensile forces are transferred far to the outside and more flexible if the filaments are positioned as far as possible to the inside. Multi-row arrangement or symmetrical and unsymmetrical grouping of the reinforcing filaments are possible.

Suitable materials into which the stiffened filaments are embedded are both amorphous and partially crystalline plastics, as well as polyblends and copolymers, for example polyamide, polycarbonate, polyester, polymethane, polyethylene, polypropylene, fluoroplastics such as PFA, ETFE [sic], FEP etc. For some applications, the reinforcing filaments do not have to be firmly bonded with the polymer matrix, but merely have a more or less good frictional engagement with the matrix.

The invention relates furthermore to a process for producing a plastic casing reinforced against tensile forces by elements for resisting extension in the plastic casing being extruded in a molten form at the same time as the plastic casing serving to receive these elements, which process is characterized in that a tube for a shrink-fit tube is extruded from crosslinkable plastic, in the wall of which the elements for resisting extension are incorporated and thus the plastic casing serves as a tube for a shrink-fit tube.

In the case of this further specific application, the production of tubes for shrink-fit tubes is possible. In this case, a tube is extruded from crosslinkable plastic, the wall of which has a number of such reinforcing filaments. These reinforcing filaments are of a plastic which, during the shaping process of the crosslinked shrink-fit tube, still has such a high tensile strength that the shrink-fit tube is expanded only in the radial direction and retains its length in the longitudinal direction during the expanding operation, without special process engineering measures. In the case of this design, reinforcing filaments which fuse or adhesively bond well with the material in which they are embedded are preferably extruded.

The invention is explained in detail by means of the illustrative embodiments described below and represented diagrammatically in the drawings.

DESCRIPTION OF THE PREFERRED EMBODIMENTS

Figure 1:
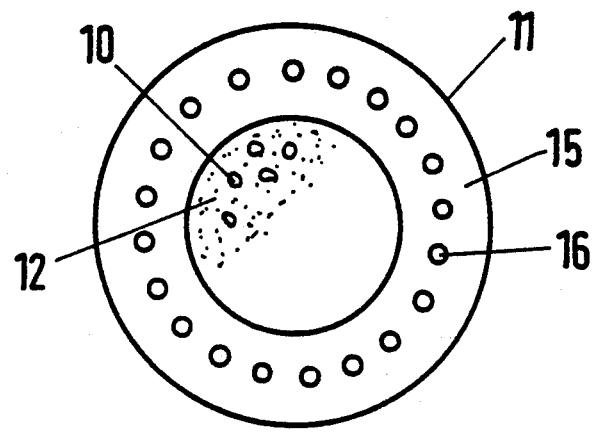
FIG. 1 is a cross sectional view of an optical multifiber unit.

In the case of the optical multifiber unit 11 represented in FIG. 1, in which a plurality of optical fibers 10 having an excess length of >1°/oo are arranged in a plastic casing 15, and this plastic casing is a thermoplastic which is reinforced against tensile forces by the insertion of elements for resisting extension in the form of reinforcing filaments 16 of high tensile strength. The individual optical fibers 10 are in this case embedded in a filling compound 12.

Figure 2:
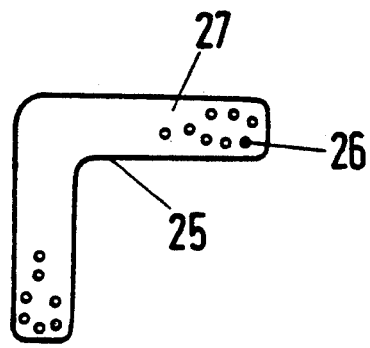
FIG. 2 is a cross sectional view through a plastic angle profile.

The plastic angle profile 25 represented in cross section in FIG. 2 has inserted elements for resisting extension in the form of reinforcing filaments 26 on both legs 27.

Figure 3:
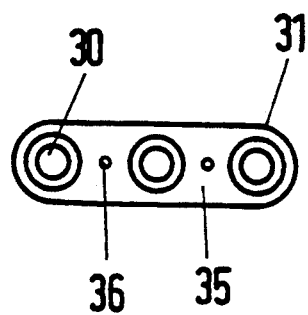
FIG. 3 is a cross sectional view through a flat line.

Finally, FIG. 3 shows in cross section a flat line 31 with optical fibers 30 embedded in the plastic insulation or material 35. Reinforcing elements 36 are inserted in the plastic material between or next to the optical fibers 30.

We claim:

1. In a process for producing a plastic casing reinforced against tensile forces by elements for resisting extension disposed in the plastic casing, the process including the elements being extruded in a molten form at the same time as the plastic casing which receives the elements, the improvement comprises the plastic casing producing a tube forming a covering for optical glass fibers or cables, said glass fiber having an excess length to the plastic casing, said elements for resisting extension being polymer elements and subjecting the plastic casing and said polymer elements to a torsional operation after extrusion and prior to completing a winding-up process so that the polymer elements for resisting extension run helically within said plastic casing.

2. In a process as claimed in claim 1, wherein the polymer elements for resisting extension consist of liquid crystal polymers.

3. In a process as claimed in claim 1, wherein the torsional operation is accomplished by using stranding devices.

4. In a process as claimed in claim 3, wherein the torsional operation is carried out with a stationary extrusion die.

5. In a process as claimed in claim 3, wherein an SZ-stranding device serves as the stranding device.

6. In a process as claimed in claim 1, which includes rotating the extrusion die.

7. In a process as claimed in claim 1, which includes embedding the optical glass fibers in a filling compound.

8. In a process as claimed in claim 1, wherein the plastic casing is extruded from cross-linkable plastic, and the plastic casing serves as a shrink-fit tube.

9. In a process as claimed in claim 8, wherein the polymer elements for resisting extension are of a plastic which, during the shaping process of the crosslinked shrink-fit tube, still has such a high tensile strength that the shrink-fit tube is expanded only in the radial direction in the shaping operation.

10. In a process as claimed in claim 8 wherein the polymer elements for resisting extension are fused with the material of the plastic casing in which they are embedded.

11. In a process as claimed in claim 8 wherein the polymer elements for resisting extension are adhesively bonded with the material of the plastic casing in which they are embedded.

12. In a process as claimed in claim 1, wherein the torsional operation is carried out with a stationary extrusion die.

* * * * *